July 29, 1952 R. D. SALMON ET AL 2,605,353

PRINTING TELEGRAPH APPARATUS

Filed Dec. 23, 1948 4 Sheets-Sheet 1

Inventors
REGINALD DENNIS SALMON
ALAN ARTHUR KIRCHEL
By R P Morris
Attorney

July 29, 1952 R. D. SALMON ET AL 2,605,353

PRINTING TELEGRAPH APPARATUS

Filed Dec. 23, 1948 4 Sheets-Sheet 2

Inventors
REGINALD DENNIS SALMON
ALAN ARTHUR KIRCHEL
By R.P. Morris
Attorney

July 29, 1952 R. D. SALMON ET AL 2,605,353

PRINTING TELEGRAPH APPARATUS

Filed Dec. 23, 1948 4 Sheets-Sheet 3

INVENTORS
REGINALD DENNIS SALMON
ALAN ARTHUR KIRCHEL
BY R P Morris
ATTORNEY

INVENTOR.
R. D. SALMON
A. A. KIRCHEL
BY
Robert Harding Jr.
ATTORNEY

Patented July 29, 1952 2,605,353

UNITED STATES PATENT OFFICE 2,605,353

PRINTING TELEGRAPH APPARATUS

Reginald Dennis Salmon and Alan Arthur Kirchel, Croydon, England, assignors to Creed and Company Limited, Croydon, England, a British company Application December 23, 1948, Serial No. 67,016
In Great Britain December 25, 1947

7 Claims. (Cl. 178—17.5)

This invention relates to printing telegraph apparatus and in particular to mechanism for recording signals made according to a printing telegraph code on a tape in a form adapted to control the retransmission of such signals and means for associating such mechanism at will either with a keyboard or with the signal responsive selector of a printing telegraph receiver.

In printing telegraph equipment it is usual to provide a keyboard for operating a transmitter and a telegraph receiver with associated equipment which prints the incoming messages and which is usually arranged so that it also prints the outgoing transmitted messages thereby providing a "home record." It is also known to provide mechanism which may be controlled by a keyboard so that, when required, messages to be transmitted can be recorded on a paper tape in a form adapted to control their retransmission, the tape being subsequently fed into an automatic tape controlled transmitter.

It is also known to provide signal responsive selector apparatus which will give a printed record of received signals and also provide a record on a tape so that the tape can be subsequently fed into a tape controlled transmitter for retransmission of the message. The most common form of mechanism for recording telegraph code signals on a tape is a perforator which punches holes in the tape corresponding to the elements of the code but it is also known to record the signals as indentations in the tape or as printed marks.

According to one feature of the present invention there is provided a printing telegraph apparatus comprising mechanism for recording signals on a tape in a form adapted to control the retransmission of signals and arrangements for controlling such mechanism either by members actuated by a keyboard or by members set in accordance with the response of a signal responsive selector to a signal combination.

According to another feature of the invention there is provided printing telegraph apparatus comprising a keyboard, a signal responsive selector and mechanism for recording signals on a tape in a form adapted to control the retransmission of signals comprising means for placing said mechanism as required under the control of said keyboard or under the control of the said selector.

According to a further feature of the invention there is provided printing telegraph apparatus comprising a keyboard, a telegraph transmitter, mechanism for recording signals on a tape in a form adapted to control retransmission, and means for operatively associating said keyboard with said mechanism, or with said transmitter or with both said transmitter and said mechanism simultaneously.

In the following description the mechanism for recording signals on a tape will be assumed to be a perforator but it is to be understood that the invention includes mechanisms modified so as to make indentations or printed marks on the tape.

It will be clear that the apparatus according to the invention provides facilities for an operator to record messages on a tape for subsequent transmission with or without simultaneously making a printed record of the matter recorded on the tape. Thus for important messages wherein it is desirable that no errors should occur the operator may have the assistance of the visible printed record but for other messages may have the advantage of increased speed of operation possible when the tape recording mechanism is directly controlled from the keyboard. Moreover one message may be recorded for control of a subsequent transmission whilst another message is being received and printed.

The invention will be described in relation to printing telegraph apparatus comprising a keyboard, a perforator for perforating tape according to a five-unit printing telegraph code, a telegraph receiver incorporating a signal responsive selector, and a telegraph transmitter adapted to be controlled by the keyboard.

Preferably provision is made for the following four combinations of the keyboard, perforator, transmitter and receiver:

(1) Perforator under control of received signals.

(2) Perforator not under control of either receiver or keyboard.

(3) Perforator under control of keyboard which is also controlling the transmitter.

(4) Perforator under control of keyboard which is however not controlling the transmitter.

To enable these four combinations to be obtained a mechanism is provided, preferably in the form of a frame movable into alternative positions, which respectively associates the perforator with the keyboard or with the telegraph receiver and this mechanism is controlled by a four-position mechanical switch which, in some positions, further operates to render the perforator or the transmitter inoperative when this inoperative condition is required.

In the preferred embodiment of the invention any of the above four combinations can be selected by manual operation of the switch, and in addition, when the switch is set in the position in which the perforator is not under control of the keyboard, it may be brought under the control of the receiver by means of a function signal received by the receiver and then may be again rendered inoperative by means of another function signal. Thus the distant transmitting operator can determine whether combination (1) or combination (2) shall be set up at the receiving end, providing neither of the combinations (3) or (4) have been set up by the operator at the receiving end. The received function signals control the combination setting as between combinations (1) and (2), by actuating the four-position switch.

For the purpose of carrying the invention into effect it is preferred that the punches for the code perforations should be set in a line transverse to the tape which is traversed one step for each line of perforations. The punches are operated by a punch hammer through interponent members. There is one interponent member for each punch and the interponent members are movable to bring them into or out of the path of travel of a punch hammer. Each interponent member co-operates with a combination reading member which may co-operate either with a lever operated by a combination bar of a keyboard or with a lever operated by the signal responsive selector of a receiver.

The signal responsive selector of the receiver includes a translating mechanism which is preferably that described in the specification accompanying our co-pending application of R. D. Salmon, bearing Serial No. 761,523, filed July 17, 1947. As described in the said specification, the selecting mechanism (as applied to a five-unit code) sets five storage members in accordance with the marking or spacing condition of five code elements. These storage members are then caused to engage respective bell crank levers by means of which five vertical rods are moved longitudinally in accordance with the respective signal elements. Each vertical rod controls a combination disc, the five combination discs serving to select a character to be printed, and a pivoted vane, the five pivoted vanes being code-function selector members to control the selection of function members which in turn control the performance of various functions.

In carrying out the present invention, the bell crank levers used to set the above-mentioned vertical rods are formed to act upon combination reading members for operation of the interponent members of the perforator.

A hand-operated mechanism is provided for moving these combination reading members into operative connection with the bell crank levers or into operative connection with subsidiary transfer bars connected to the combination bars of the keyboard. This hand-operated mechanism also, as stated above, may operate means to remove the transmitter from the control of the keyboard when desired.

The perforator mechanism is controlled by a cam sleeve which is driven through a ratchet clutch from a spindle rotated by the same motor that drives the transmitter cam spindle and the various cam spindles in the receiver. The perforator cam spindle is geared to rotate at a somewhat higher speed than the driving spindles of the transmitter or receiver for a reason which will be explained later. The perforator cam sleeve rotates once for each row of code perforations to be punched and cams thereon operate respectively the above-mentioned punch hammer for the code perforations, a punch for feed perforations in the tape and pawls for rotating ratchet wheels which effect feeding of the tape. The perforator cam sleeve is released for rotation either by the universal bar of the keyboard or by the receiving mechanism in response to a signal.

The punch hammer for the centre-hole feed perforations operates in a punch block through which the tape passes prior to its passage through the punch block for the code perforations. The feed mechanism for the tape consists of a feed roller against which the tape is pressed by a pressure roller and a sprocket wheel which engages the centre holes of the tape after they have been perforated.

The feed roller and the sprocket wheel are mounted on individual pinions. Fixed to each pinion is a ratchet wheel and each ratchet wheel is rotated by a pawl, the two pawls being actuated together. The feed roller serves to supply the tape to the feed perforator punch block and the sprocket wheel serves to supply the tape to the code perforator punch block.

It will be clear to one skilled in the art that the punches for perforating the tape may be replaced by members for printing or impressing marks upon the tape with only slight consequent modifications of the apparatus to be hereinafter described.

The nature of the invention will be better understood from the following description of a preferred embodiment taken in conjunction with the accompanying drawings in which.

Figure 1:
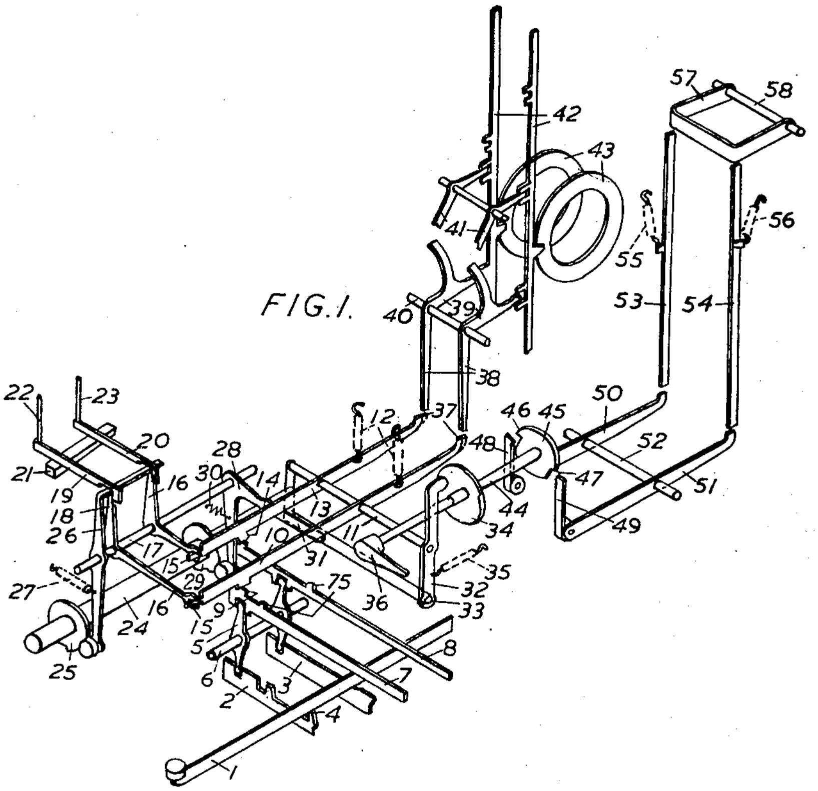
Fig. 1 shows the means by which the perforator may be actuated either by the keyboard or by the telegraph receiver as required.

In Fig. 1 there are shown the arrangements by which the tape can be perforated either by the operation of the keys on the keyboard or by the receiving mechanism. Key 1 represents any key on the keyboard other than the "run-out" key, the functioning of which will be explained later. Underneath the keys there are keyboard combination bars 2, 3. There are five such combination bars representing the five code elements of the the five-unit code. In the case of a code of more than five units there are, of course, the corresponding greater number of keyboard combination bars. For simplicity in the drawing only two of the keyboard combination bars and associated members are shown. It can be seen that when key 1 is depressed code combination bar 2 will be moved to the left when the key co-operates with the sloping surface 4, while combination bar 3 will not be moved. Similarly the three other combination bars (not shown) will be actuated according to the cuttings of the grooves corresponding to the actual key depressed. When combination bar 2 is moved to the left it acts through connecting lever 5 pivotally mounted on a spindle 6 to move subsidiary transfer bar 7 to the right. Subsidiary transfer bar 8 is similarly linked to combination bar 3 and as shown is not moved when key 1 is depressed. The movement of bar 7 to the right results in the projection 9 on combination reading member 10 (which member is pivotally mounted on shaft 11) being moved to a position in which it will not prevent member 10 from rotating counter-clockwise under the tension of spring 12 when released to do so as described below. (All the reading members 10, 13, etc., there being one for each element of the code employed, are mounted on shaft 11.) Reading member 13 will however not become free to rotate counter-clockwise when key 1 is depressed since transfer bar 8 will not have been moved to the right and member 13, when released to rotate as described below, will be prevented from rotating by the projection 14 which will drop onto the corresponding portion of bar 8. In the normal rest position there is just enough clearance between projections 9, 14, etc., and transfer bars 7, 8, etc., to permit the combination bars 2, 3, etc., to move freely when a key is depressed. When the reading member 10 is released to rotate by the cam action to be described, the dropping of its left-hand end 15 will operate bell crank 16, pivoted on spindle 17, and the other end 18 of the bell crank will pull interponent member 19 to the right. The corresponding interponent member 20 will not be moved to the right because reading member 13 is prevented from rotating counter-clockwise since transfer bar 8 remains unmoved. Underneath the interponent members 19, 20 and the other three similar members (not shown) is the punching hammer 21, which strikes upwards against the interponent members and actuates those of the punches 22, 23, etc., corresponding to those interponent members which have not been moved to the right. Thus in the present case the punch 22 would not be actuated since interponent member 19 will have been withdrawn toward the right, but punch 23 would be actuated since interponent member 20 was not withdrawn (as was interponent member 19), due to the immobility of reading member 13 and the bell crank 16 associated therewith and a hole would be punched in the tape corresponding to punch 23, representing a marking code element. The punching hammer 21 is actuated by a cam on the perforator cam sleeve 24 as will be explained later. After the hammer 21 has been actuated to punch the desired combination, cam 25 moves the lower end of the resetting frame 26 to the right rotating it about the spindle 17, which results in the upper part of the frame 26 moving toward the left, thereby pressing any of the interponent members 19, 20, etc., which had been withdrawn from their normal positions under the punches back toward the left into their normal operative positions.

As soon as the interponent members have been reset the reestting frame 26 returns to its normal position under the influence of spring 27, leaving the interponent members free to be withdrawn by the bell-cranks 16 when the next combination is to be set up.

The means for releasing the subsidiary transfer bars 10, 13, etc., to rotate counter-clockwise referred to above, will now be described.

A bell crank 28, also pivoted on spindle 17, is operated by cam 29 on the perforator cam sleeve 24, and when this bell crank is released by the cam 29 the lower end of the bell crank 28 is drawn to the left by spring 30, so that the upper arm 31 of the bell crank 28 is dropped thus releasing the combination reading members 10, 13, etc., which will, as explained above, rotate under the influence of springs 12, if they are allowed to by the previous movement to the right of subsidiary transfer bars 7, 8, etc. The correct timing of the various operations is controlled by the settings of the cams on the cam sleeve 24.

The operation of punching the tape using the keyboard has now been described. The perforator is however also arranged so that it can be operated by the receiving equipment of the telegraph printer. The shaft 11 on which the combination reading members 10, 13 are pivoted, is mounted on a frame of which only the lever 32 forming one end of the frame is designated. This frame is rotatably pivoted as shown at 33. The upper end of lever 32 is kept pressed against a cam 34 by the action of spring 35. The cam 34 is only shown diagrammatically. Cam 34 can be rotated manually by means of handle 36. When the upper end of lever 32 drops into the depression in cam 34, shaft 11 is moved to the right so that the combination reading bars 10, 13 are also moved to the right and their ends 37 take up the position shown in dotted lines where they can co-operate with the long tails 38 of bell cranks 39 mounted on spindle 40 which form part of the translating mechanism described in the specification accompanying the said co-pending application. Projections 9 and 14 on members 10 and 13 respectively are at the same time moved to the right so that they no longer co-operate with the subsidiary transfer bars 7 and 8 and members 10 and 13 are effectively disconnected from the keyboard. The ends 15 of members 10 and 13 however continue to engage bell-cranks 16 due to the slotted construction of the ends of bell cranks 16 and the slidable fit thereinto of the members 10 and 13.

As is explained in the above-mentioned co-pending application, bell-cranks similar to bell cranks 39 and 41 are struck by the storage members of the signal selector and storage mechanism when each signal combination has been received. The upper bell-cranks 41 are struck when a spacing element has been stored, the lower bell-cranks 39 when a marking element has been stored. The bell cranks engage with the vertical rods 42 which are therefore moved upwards for a spacing element or downwards for a marking element. There are five vertical rods 42 representing the five elements of the code, and they are also linked with the rotatable code discs 43 which are the character selector members determining the actual character to be printed.

In the present case the lower bell cranks 39 have been provided with the long tails 38, so that they can co-operate with the perforator mechanism. It can be seen that if the upper part of a bell crank 39 is struck by a storage member, representing a marking element, the tail 38 will be moved to the left and it is arranged that when in this position it prevents the end 37 of the combination reading member 10 or 13 from rising under the influence of the springs 12, when bell crank 28 is rotated. The action therefore is identical with that described above in connection with the setting of the interponent members 19, 20 by means of the keys of the keyboard. The interponent members are withdrawn from their operating positions when a spacing element is received but remain in position when a marking element is received, and therefore cause the punches to perforate the tape as described before. Cam 34 which determines whether the perforator is under the control of the keyboard or of the telegraph receiver can be operated by hand as explained above. The handle 36 and the cam 34 are mounted on a shaft 44 which also carries a control plate 45, the purpose of which is to enable the shaft 44 to be rotated under the control of signals received by the telegraph receiver as will be explained below. The shaft 44 carries other cams, the functions of which will be described later, in connection with Fig. 5, and the whole assembly of cams on shaft 44 constitutes a four-position mechanical switch, so arranged that any desired combination of functions of the keyboard, the perforator and the receiver can be obtained by setting the switch into one or other of the four positions. The additional cams are however not shown in Fig. 1, as they do not enter into the controls of the functions by means of received signals.

In Fig. 1 there is shown the control plate or cam 45, which is provided with two shoulders 46, 47, which can be operated upon by arms 48, 49 respectively. These arms 48, 49 are diagrammatically represented and a more practical form will be shown in Fig. 5. Arms 48, 49, are shown mounted on the ends of levers 50, 51, rotatably mounted on a spindle 52. Levers 50, 51 respectively can be rotated clockwise by the action of push-rod 53 or push-rod 54. These push-rods 53, 54 are slidably mounted on function members, otherwise referred to as function selector bars and which are not shown, of the kind described in the specifications accompanying the said copending application and in the further copending application of R. D. Salmon bearing Serial No. 14,177, filed March 11, 1948. These will be referred to as function members in the following descriptions. As is explained in the specifications referred to, these function members are each pivoted at one end and are associated with the function translating mechanism in the receiver in such manner that any particular function member or members may be tilted into either of two positions when a particular code combination or sequence of selected code combinations is received. The function members then control further functions to be performed by the telegraph receiver such as carriage return, line feed, tabulation, etc.

In the present case, two function members are provided and arranged in the manner described in the specification of said last mentioned applications to be responsive to received code combinations indicating "Perforator off" and "Perforator on."

The push-rods 53, 54 are slidably mounted on the respective function members and will therefore be tilted when the members are tilted. Normally the push-rods are pulled upwards so as to be clear of the levers 50, 51 by the action of springs 55, 56. Above the push-rods is a cam-operated function operating bail 57 pivoted on a spindle 58. This bail is driven downwards once for each code combination received, by means of a cam (not shown), but it only strikes one of the push-rods 53, 54 when the appropriate code combination has been received to tilt the "Perforator off" or "Perforator on" function member into the position which brings the upper end of the appropriate push-rod under the bail. When push-rod 54 is struck by bail 57, the perforator will be in the "on" position, and similarly when push-rod 53 is struck by bail 57, the perforator will be in the "off" position.

The telegraph receiver printing mechanism will be operated whether the perforator is being operated by the received signals or not and the incoming message will be printed, but the message will also be recorded by the perforator in the form of punched tape, if the "Perforator on" function signal precedes the reception of the message.

Figure 2:
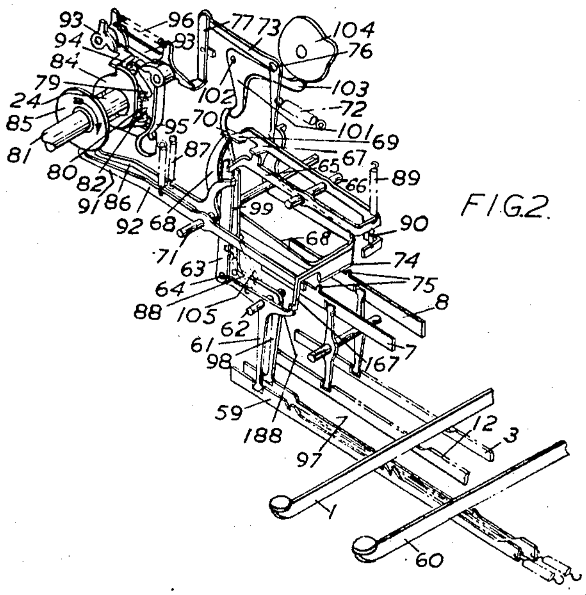
Fig. 2 shows the means by which the perforator cam sleeve is set into rotation when a signal combination is to be perforated.

The perforating process described hitherto depends on the correct timing of the various operations and this depends, as was explained, on the actions of a number of cams carried on the perforator cam sleeve 24. In Fig. 2 the means for starting the rotation of this cam sleeve is shown. Key 1 which may be any key of the keyboard (except the "run-out" key) engages the keyboard combination bars 2, 3 as explained above but also engages a trip or universal bar 59. Every key, other than the "run-out" key 60 engages this bar and drives it to the left when the key is depressed. This movement rotates bell crank 61 clockwise about its pivot 62 and raises trip latch 63 which is pivotally connected to the bell crank 61 at 64. The raising of the trip latch 63 raises the locking frame latch operating member 65, which is pivoted on a spindle 66 and this raises the locking frame latch 67 and releases the locking frame 68 by releasing the latch formed by cooperating portions 69 and 70. Locking frame 68 is mounted on a spindle 71 and has a portion 68*a* which portion is pressed by spring 72 operating through a bell crank 73, the purpose of which will be explained later, and rotates clockwise around spindle 71. The knife edge 74 of the locking frame 68 comes down on one side or the other of the co-operating knife edges 75 carried on the subsidiary transfer bars 7, 8, etc. thus locking the combination set up by the particular key operated. Bell crank 73 pivoted at 76 moves counter-clockwise under the influence of spring 72 and its pivoted extension 77 presses down the perforator cam detent 78. Pawl 79 is pivoted on the cam sleeve 24 and is normally held by spring 82 in engagement with ratchet 80. Ratchet 80 is fixed to the continuously rotating cam spindle 81. However detent 78 has been holding pawl 79 out of engagement with ratchet 80 against the tension of spring 82.

Figures 4, 5:
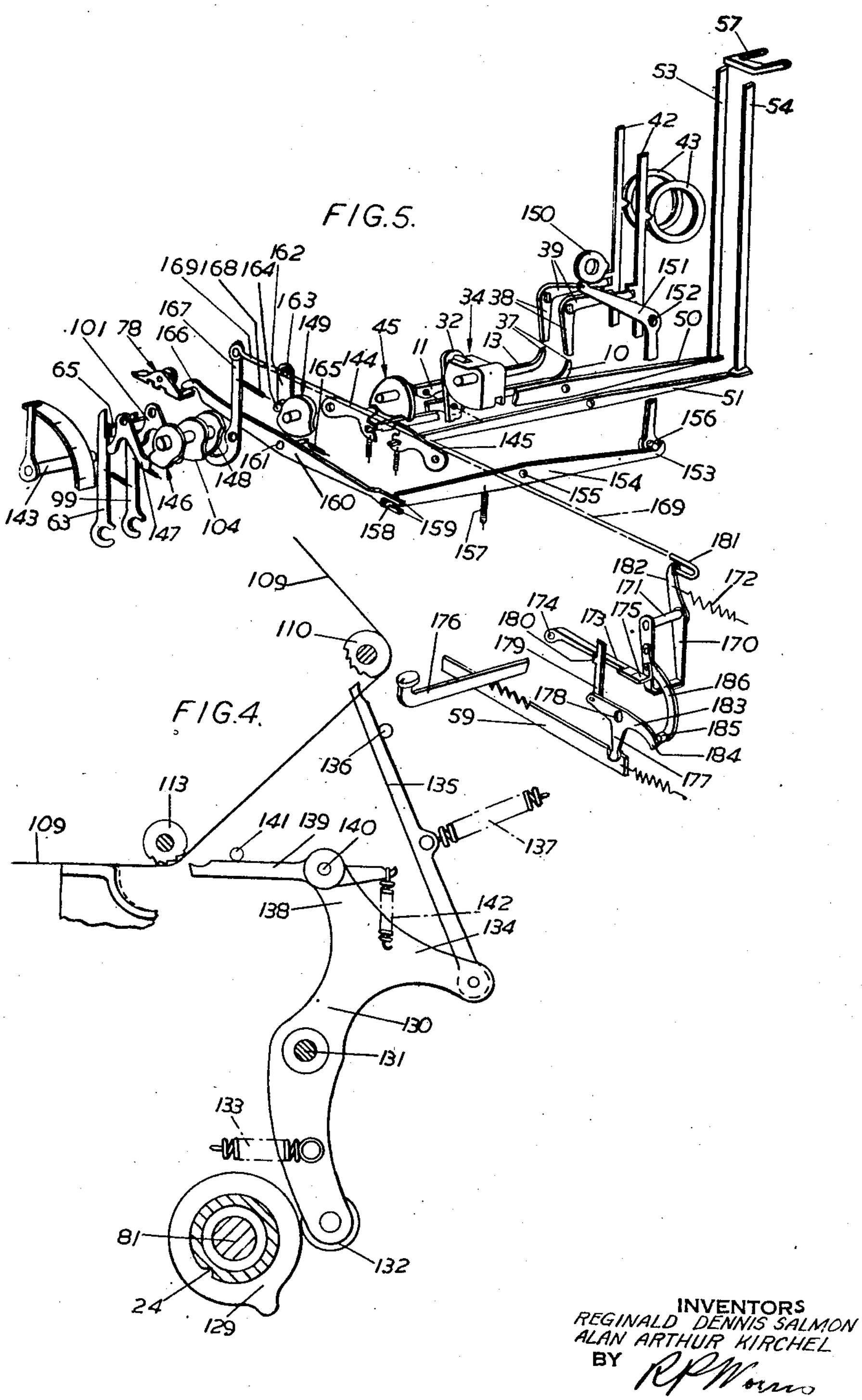
Fig. 4 shows the arrangements for feeding the tape through the perforator.
Fig. 5 shows the four position mechanical switch together with sufficient parts of the signal selector mechanism, keyboard mechanism, transmitter mechanism and perforator mechanism to show the manner in which the changes are effected in the various positions of the switch.
Figures 2A, 5A:
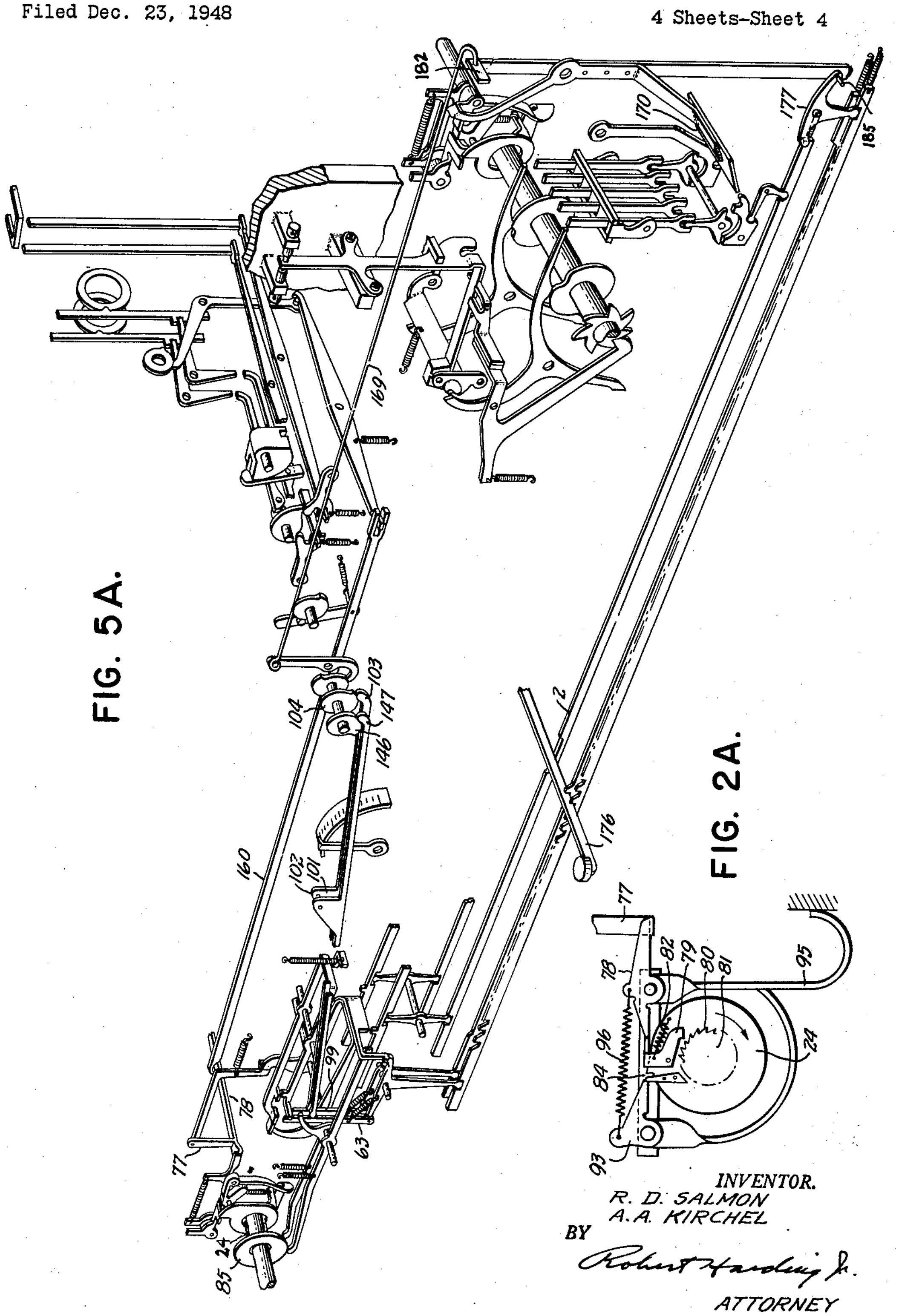
Fig. 2A is an end view of a clutch mechanism used to couple the receiving sleeve to the continuously rotating cam spindle shown in Fig. 2.
Fig. 5A shows the transmitting features of the device in relation to the receiver and keyboard portions thereof.

Fig. 2A is an end-view of the clutch mechanism constituted by the elements 77—80, and clearly discloses the cooperation of the said several elements.

When extension 77 presses the detent 78 down, the ratchet 80 which is fixed to the continuously rotating cam spindle 81 is engaged by the pawl 79 owing to the tension of spring 82 and the cam sleeve 24 which carries cams 84 and 85 commences to rotate. The first thing which happens is that cam 85 actuates lever 86 and rotates it counter-clockwise about spindle 71 against the tension of spring 87. Lever 86 has a bent portion 86*a* which embraces trip latch 63. Thus, movement of lever 86 in a counter-clockwise direction moves trip latch 63 out of engagement with the locking frame latch operating member 65 since trip latch 63 is rotated counter-clockwise against the tension of spring 88. The locking frame latch operating member 65 then also moves counter-clockwise about pivot 66 under the influence of spring 89 which extends spring 90. Spring 90 is connected between an extremity 67*a* of latch 67 and member 65 and upon extension of spring 90, as aforesaid, member 65 is connected to latch 67.

Lever 91 also rides on cam 85 and is next operated by cam 85 against the tension of spring 92. Lever 91 has an extremity 91*a* which lifts the locking frame 68 at portion 68*b* so that the knife edge 74 is clear of the knife edges 75 and also lifts locking frame 68, far enough to allow the latch formed by co-operating portions 69, 70 to relatch under the tension of spring 90.

Towards the end of one revolution of cam sleeves 24, cam 84 lifts latch 93 against the tension of spring 96 allowing lug 94 which is attached to cam sleeve 24 to pass underneath it. Pawl 79 then comes into contact with detent 78 which will have returned to its normal position when the locking frame 68 was relatched by the operation of lever 91. Pawl 79 is therefore released from the ratchet 80 and the revolution of the cam sleeve 24 is stopped and the sleeve 24 held in fixed position by the contact of latch 93 against lug 94 preventing backlash in the counter-clockwise direction, and preventing movement in the clockwise direction due to the engagement of pawl 79 by detent 78. The detent 78 and the latch 93 are mounted on a somewhat resilient metal frame 95 and spring 96 serves to keep them both in their normal rest positions until they are actuated by the appropriate cam and lever actions respectively In the figure there is also shown a key 60 which is the "run out" key. The purpose of this key is to enable the operator to cause a length of tape to be passed out from the perforator at the end of a message without having to operate the spacing key a number of times. This is achieved by causing the cam sleeve 24 to be rotated so long as the key is kept depressed instead of stopping after one revolution. Key 60 does not actuate the universal bar 59 but actuates a corresponding bar known as the "run out" bar 97 by moving it to the left. Bar 97 rotates bell crank 98 clockwise and raises a trip latch 99 which raises the locking frame latch operating member 65 in exactly the same way as normally occurs when any other key moves the universal bar 59 and raises trip latch 63. In this case however, since trip latch 99 is not under the control of cam 85 through any lever such as lever 86 the cam sleeve 83 will continue to rotate so long as key 60 is kept depressed.

Trip latch 99 is shown with an upward extension 100 pressing against a bell crank 101 pivoted at 102. The other end 103, of the bell crank 101, presses against cam 104. This cam forms part of the four-position switch to be described later with reference to Fig. 5.

When this cam 104 is operated to the position where the crest causes bell crank 101 to be rotated clockwise, trip latch 99 is rotated counter-clockwise against the tension of spring 105 and so disengages from trip latch operating member 65. Thus operating the "run-out" key under these conditions will not raise member 65 and the perforator cam sleeve 24 will not be set into rotation. A similar provision is made for suppressing the action of the universal bar so that when the four-position switch is appropriately set the performator cam sleeve will not be set into rotation if and when any key of the keyboard is depressed. This is an essential provision to prevent the perforator being operated by the keyboard when received signals are being perforated.

The "run-out" key, as is explained above, provides for the perforator cam sleeve 24 to continue in rotation so long as the key 60 is held depressed. Certain other function keys also require this facility, e. g. the form-feed key run-out and the tabulating key and the facility may be obtained by making these keys actuate the "run-out" bar 97 in addition to setting up the desired form-feed or tabulating code combination.

Figure 3:
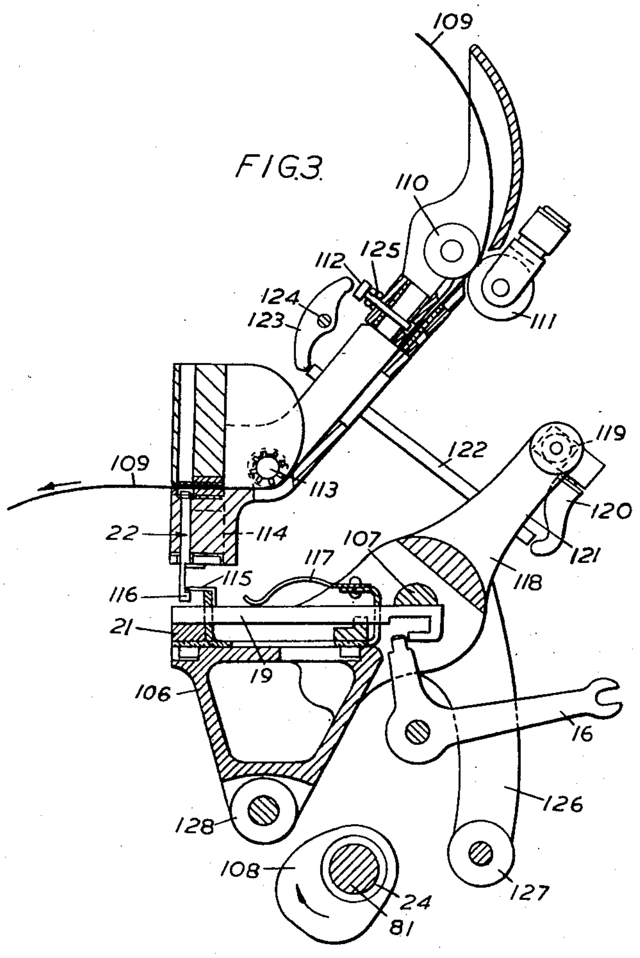
Fig. 3 shows in detail the punching mechanism for perforating the tape.

In Fig. 3 there is shown in greater detail the punching mechanism for perforating the tape.

The punches are actuated by punching frame 106 which is shown partly in section. This frame is pivoted on a spindle 107 and is operated by a cam 108 carried on cam sleeve 24 (see also Fig. 2), mounted on the continuously rotating spindle 81 and engaged with it by the pawl 79 and ratchet 80 arrangement when required, as previously described. The paper tape 109 is fed into the machine between driven friction rollers 110, 111, the action of which will be described later in connection with the feed mechanism (Fig. 4). After passing the feed rollers 110, 111, the tape is fed to the centre hole punch 112 which punches evenly spaced, centre holes in the tape. The tape then passes to a sprocket driving wheel 113 which engages the centre holes which have been punched in the tape and draws the tape forward a length equal to the spacing between two successive centre holes for each revolution of the cam 108 as will be explained later. The tape then passes through the punch block 114 carrying the punches 22, 23, etc. (see Fig. 1). There are five punches corresponding to the five elements of the code but only one punch designated 22 is shown in Fig. 3. Beneath the lower end of punch 22 there is shown an interponent member 19 which is one of the members 19, 20 etc. (as shown in Fig. 1). Below member 19 is shown, in Fig. 3, the punch hammer 21 carried on the punching frame 106. It will be seen that every time the punching frame 106 is rotated clockwise by cam 108 the punch hammer 21 is driven upwards and will drive selected punches 22, 23, etc., upwards, the selection depending upon which of the interponent members 19, 20 have been withdrawn by the actions of bell cranks 16, as above explained in connection with Fig. 1.

Thus the five punches 22, 23, etc., are operated selectively according to the code combination set up and perforate the tape according to the desired combination. It will be observed that the interponent member 19 is slidably mounted in the punching frame 106 and that it carries a projection 115 which engages with a shoulder 116 formed on the lower end of punch 22. This projection 115 operates to retract the punch after it has been actuated when the punching frame is returned to its normal position after a hole has been punched in the tape. If the interponent member 19 has been withdrawn by bell crank 16 the projection 115 no longer engages shoulder 116 on punch 22 but since punch 22 will not be operated when the interponent member is withdrawn retraction of the punch is not required. A damping spring 117 mounted on the punching frame 106 keeps the interponent member 19 pressed down on the punching hammer 21 to eliminate any rebound of member 19 after it has been set. An arm 118 forming part of the punching frame 106 operates the centre hole punch 112 every time the punching frame 106 is rotated clockwise. The end of arm 118 is linked at 119 to a lever 120, pivoted at 121 and every time lever 120 is rotated clockwise it drives the linking rod 122 actuating a punching lever 123, pivoted at 124, which drives the centre hole punch 112 so as to punch a centre hole in tape 109. Punch 112 is retracted by the action of spring 125.

It will be understood that the punching frame 106 is rocked clockwise to effect each punching operation and that it simultaneously punches a centre hole at one position along the paper tape and the desired combination at another position separated from the last-mentioned position by a plurality of successive centre holes. After each punching operation the punching frame has to be returned to its normal position so as to be in position to be operated when the next combination has to be punched. Firmly but adjustably attached to the punching frame 106 there is a punching frame return arm 126 carrying at its lower end a roller 127.

When cam 108 is rotated its crest first presses against roller 128 to rotate the punching frame 106 clockwise and then presses against roller 127 to return the punching frame to its normal position. In practice it is found convenient to provide two separate cams corresponding to cam 108 one to operate the punching movement and the other to operate the return movement of the punching frame 106.

The means for restoring the interponent members 19, etc., to their operative positions is not shown in Fig. 3 but has already been described in connection with Fig. 1.

Fig. 4 shows the arrangement for feeding the paper tape and should be considered in conjunction with Fig. 3. In Fig. 4 there are shown ratchet wheels which it is to be understood are respectively mounted on the same spindles as the friction roller 110 and sprocket wheel 113 shown in Fig. 3, and which are in effect integral therewith and they have therefore been given the same reference numerals 110 and 113. The paper tape 109 passes around the friction roller portion of wheel 110 and is engaged by the sprocket portion of wheel 113. On the perforator cam sleeve 24 there is carried in addition to cams 25 and 29 (see Fig. 1), a cam 129 shown in Fig. 4, which, once in each revolution, actuates the feeding frame 130 which is pivoted at 131, the cam follower 132 revolvably mounted on frame 130 being kept pressed against the cam 129 by spring 133 which is attached to feeding frame 130.

The upper part of the feeding frame 130 is provided with two arms 134 and 138. Arm 134 is pivotally connected to the centre hole punch feed pawl 135 which is kept pressed against a stop 136 by a spring 137. The pawl 135 engages with ratchet wheel 110 and drives it around one tooth for each revolution of cam 129. Similarly the other arm 138 of the feeding frame 130 carries the combination punch feed pawl 139 which is pivotally mounted on arm 138 at 140 as shown. Pawl 139 is kept pressed against a stop 141 by spring 142. Pawl 139 engages with ratchet wheel 113 and drives it around one tooth for each revolution of cam 129. Thus for each revolution of cam 129 the tape 109 is fed forward one step, both by the friction roller indicated at 110 (Fig. 3) and the sprocket wheel indicated at 113.

As explained previously arrangements are provided to enable the perforator to be operated by the keyboard or by the receiving mechanism. In practice four possible combinations are required. These are as follows:

(1) Perforator under the control of receiving mechanism so that a perforated tape record is made as well as a printed record.

(2) Perforator not under the control of either keyboard or receiving mechanism.

(3) Perforator under the control of the keyboard while the keyboard is also controlling the transmitter. By this means a printed record can be made corresponding to the perforated signals.

(4) Perforator under control of keyboard only, the transmitter being inoperative.

The four numbered combinations above are provided for by means of a four-position manually operable mechanical switch, two of the four positions being however also selectable by means of signals from the distant transmitter.

Fig. 5 shows the manually operable four position mechanical switch in the position in which the perforator is placed under control of the receiver. This switch comprises a shaft 143 on which are mounted a number of cams. These cams comprise a cam 34 which is similar in its action to the similarly numbered cam shown in Fig. 1, though it is here shown as a cam provided with a helical groove in its periphery, the cam follower carrying a pin which engages the helical groove and is therefore operated when the cam is rotated. The cam follower pin 32 sliding in the helical groove is mounted on the cam follower lever 32*a*, shaft 11 being attached to lever 32 which lever is pivoted at its lower end as shown in Fig. 1. Shaft 11 thus will move laterally as lever 32 is moved due to the rotation of cam 34. Shaft 11 is shown only as a broken line in Fig. 5, and on this shaft are mounted the combination reading members 10 and 13 which are movable into and out of positions in which their turned up ends 37 are below the tails 38 of bell cranks 39 as explained previously with reference to Fig. 1. In Fig. 5 these ends 37 are shown in position to be operated by the depending tails 38 of the bell crank levers 39 operated from the translating mechanism of the receiver.

Another cam 45 on the shaft 143 corresponds to the similarly numbered cam in Fig. 1 and is positioned so that it may be rotated and with it the shaft 143 and the other cams mounted on the shaft by means of members 144 and 145 which perform the same function as the members 48 and 49 of Fig. 1, and like them are actuated by the levers 50 and 51 under the influence of the push rods 53 and 54. The push-rods 53, 54 are operated by the receiving mechanism as described with reference to Fig. 1, to bring the perforator under the control of the receiver or to render the perforator inoperative. As shown in Fig. 5, the member 145 is the member that has last been operated under control of the receiver and has rotated the cam 45 and with it the shaft 143 into the position shown in which the perforator mechanism is under the control of the receiver.

The shaft 143 also carries a cam 146 which operates through a bell crank lever 146*a* on the trip latch 63. In the position shown, cam 146 has moved trip latch 63 out of the position in which it can control the locking frame latch operating member 65 (see also Fig. 2). As the keyboard controls the perforator through the medium of the action of the trip latch 63 on member 65, as described with reference to Fig. 2, the cam 146 has rendered this control by the keyboard inoperative. Shaft 143 also carries a cam 104 (seen also in Fig. 2) which operates through bell crank 101 on the trip latch 99 to move it into the position in which it has no action upon the member 65. As the "run-out" key 60 (Fig. 2) controls the operation of the perforator through the action of latch 99 on member 65, as explained above in connection with the operation of Fig. 2 it will be seen that in the position shown in Fig. 5, the cam 104 puts the "run-out" key out of operative association with the perforator trip latch 99 being thereby prevented from engaging member 65 as described in connection with the operation of Fig. 2. The shaft 143 also carries a cam 148, which serves in certain positions of the shaft to remove the transmitter from control by the keyboard but in Fig. 5 the cam 148 is inoperative for that purpose. The action of cam 148 will be described later.

Cam 149 on shaft 143 determines whether the perforator cam sleeve 24 (Figs. 1 and 2) is to be controlled by the receiver or by the keyboard. In the position shown in Fig. 5 the cam sleeve is under the control of the received signals. On the translator cam sleeve of the receiver (not shown) there is a cam 150. The translator cam sleeve is set into rotation once for each received signal combination and rotates cam 150. This cam actuates bell crank 151 pivoted at 152 and this acts on the sloping end 153 of a lever 154 pivoted at 155 and kept pressed against a roller 156 carried on the lower end of bell crank 151 by means of spring 157. The end 158 of lever 154 engages the forked end 159 of a lever 160 and presses it downwards when cam 150 actuates bell crank 151. Lever 160 is pivotally mounted at 161 on an arm 162 which is itself pivoted at 163. Arm 163 carries a projecting stud 164 which is the cam follower for cam 149 and is kept pressed against the cam by means of a spring 165. The turned down end 166 of lever 160 when in the position shown in Fig. 5 actuates the perforator cam detent 78 and sets the perforator cam sleeve 24 into rotation in just the same way as the pivoted extension 77 shown in Fig. 2, operates when the perforator is under the control of the keyboard.

It can be seen that if cam 149 is rotated to a position in which cam follower 164 is pressed to the left the lever 160 will be moved toward left and its turned down end 166 will no longer operate on the perforator cam detent 78. This is the condition required when the apparatus is to operate according to combinations (2), (3) and (4) set out above.

Fig. 5 as explained above shows the four position switch in the position where the facility provided is that the perforator is under the control of the receiving mechanism i. e. combination (1) above.

For combination (2) the switch is rotated clockwise to its second position so as to disconnect the perforator both from the keyboard and the receiver.

In this second position cams 146 and 104 are still holding the trip latches 63 and 99 out of operative position so that the perforator cam sleeve 24 cannot be set into rotation if any key of the keyboard is depressed. Cam 148 is still in a position allowing the transmitter to be operated by the keyboard, as will be explained later.

Cam 149 will however have been rotated to a position which moves lever 160 to the left and out of operative connection with the perforator cam detent 78. Cam 45 will have been rotated to a position in which it could be actuated by member 145 if the distant station sent the function signal to bring the perforator into operation. Cam 34 will have been rotated to a position in which the combination reading members 10, 13 have been withdrawn to the left and out of engagement with the tails 38 of bell cranks 39. The four-position switch may be moved from position (1) to position (2) either by manual rotation of shaft 143 or by action of member 144, operating as described upon cam 45.

For combinations (3) the switch is further rotated clockwise to its third position by manual rotation of handle 143*a* and consequently shaft 143, and in this position cam 146 will release the perforator trip latch 63 but cam 104 will still be holding the "run-out" trip latch 99 out of engagement with latch operating member 65. Thus the perforator cam sleeve 24 will be set into rotation when any key except the "run-out" key, of the keyboard is depressed. It is necessary, when combination (3) is set up, that upon depression of the "run-out" key the release of the perforator cam sleeve 24 shall be controlled by the rotation of the transmitter cam sleeve owing to the fact that the perforator cam spindle rotates at a higher speed than the transmitter cam spindle. It is for the reason that the "run-out" key is not allowed to operate that the perforator "run-out" trips when the four-position switch is set to position (3) in which the keyboard controls both the perforator and the transmitter simultaneously and an explanation of the arrangements provided will be found below.

In position (3) cam 148 is still in the position allowing the transmitter to be operated by the keyboard. Cam 149 still retains lever 160 out of operative connection with the perforator cam detent 78. Cam 45 will have been rotated to a position in which it cannot be actuated by either of the members 144 or 145. This is essential as the perforator is to be kept under the control of the keyboard. Cam 34 continues to hold the ends 37 of the combination reading members 10, 13 out of operative engagement with the tails 38 of bell crank lever 39.

For combination (4) in which the perforator is to be under the control of the keyboard alone and the transmitter is to be inoperative the switch is further rotated clockwise to its fourth position by manual rotation of handle 143*a*, as explained above in connection with switch position 3. In this case cams 146 and 104 are both in the position to allow trip latches 63 and 99 to be operative so that the perforator cam will be set into rotation when any key of the keyboard is depressed including the "run-out" key. Cam 148 will be operative as will be explained below. Cam 149 will still keep lever 160 out of operative connection with the perforator cam detent 78. Cam 45 will still be in a position in which it cannot be actuated by either of the members 144 or 145 which is essential as the perforator is now solely under the control of the keyboard. Cam 34 continues to hold the combination reading members 10, 13 out of operative engagement with the tails 38.

When the four position switch is rotated to its fourth position for condition (4) in which the perforator alone is to be operated by the keyboard, cam 148 acts to prevent the transmitter being operated under the control of the keyboard.

Cam 148 is rotated to a position in which it rotates lever 167 counter-clockwise against the action of spring 168 and this draws link rod 169 to the left and operates on the transmitter trip mechanism to prevent the transmitter cam sleeve being set into rotation. The transmitter trip mechanism is described in the specification accompanying co-pending application of R. D. Salmon, bearing Serial No. 118,123, filed September 27, 1949, and this normally serves to cause a ratchet clutch to cause the transmitter cam sleeve to be driven by the continuously rotating trnsmitter cam spindle when any key of the keyboard is depressed. The purpose served by cam 148 in the present combination is to prevent this occurring thus preventing the transmitter from being operated by the keyboard.

In connection with the following description of the means for preventing the transmitter from being operated a somewhat diagrammatic and simplified representation of the trip mechanism described in the last mentioned copending application is shown in Fig. 5. The resetting and locking arrangements therein described do not affect the operations now being considered.

A frame 170 pivoted on a spindle 171 is urged by a spring 172 into clockwise rotation but is prevented from rotating by a lever 173 pivoted at 174 the end of which rests against an abutment 175 mounted on frame 170. When any key 176 of the keyboard is depressed it moves the universal bar 59 to the left and this rotates clockwise a three-armed member 177 pivoted at 178. The clockwise rotation of the three-armed member 177 raises an arm 179 which by means of a shoulder 180 co-operating with a notch in lever 173 raises lever 173 out of engagement with abutment 175 on the frame 170. Frame 170 is thus free to rotate in a clockwise direction about its pivot 171 under the action of spring 172. This movement initiates the rotation of the transmitter cam sleeve as explained in the last mentioned copending application. When link rod 169 is drawn to the left by the action of cam 148 its hooked end 181 engages with the upward extension 182 of frame 170 and prevent this frame from being rotated clockwise when any keys are depressed so that the transmitter cam sleeve is not set into rotation and the transmitter is inoperative.

Fig. 5A is a view in perspective of that portion of the apparatus which sets the perforator cam sleeve 24 into rotation and a portion of the transmitter trip mechanism which is more fully described in the copending application Serial No. 118,123, filed September 27, 1949. Similar elements shown in Fig. 5 are similarly numbered in Fig. 5A, and their cooperation with the entire apparatus is plainly evident in view of the explanation previously given with respect to the operation of the equipment shown in Figs. 2 and 5.

When the keyboard is being used to control the perforator and the transmitter simultaneously it is important to ensure that the cam sleeves of both are set into rotation upon the depression of any key. Both cam sleeves are released to rotate by the operation of the universal bar 59 of the keyboard but should any difference in backlash develop or other minor inaccuracy of adjustment occur, it would be possible for the depression of a key to be sufficient to release one cam sleeve but just not sufficient to release the other, with the result that the perforated record would not agree with the transmitted message as some signal combinations would be missed.

For this purpose provision is made so that the locking frames which actuate the cam detents on the perforator and the transmitter respectively are arranged so that when either locking frame 68 or 170 is released to actuate a detent it will cause the universal bar 59 of the keyboard to be moved to its fully operated position irrespective of any further depression of the key and will thus cause the other detent to be actuated.

The means by which this is accomplished is shown in Figs. 5 and 2. In Fig. 5 the three-armed member 177 is provided with an arm 183 having a cam surface 184 which cooperates with a roller 185 carried on a downward extension 186 of frame 170. When this frame 170 is rotated clockwise in consequence of the operation of the universal bar 59 this roller causes three-armed member 177 to further rotate clockwise and therefore to move universal bar 59 to the left to its fullest extent thus ensuring that the perforator release is also operated through the action of trip latch 63 (Fig. 2).

This provides for the case when the transmitter cam sleeve may have been released to rotate before the perforator cam sleeve 24. The arrangements for ensuring that the transmitter cam sleeve shall be released if the perforator cam sleeve is first released are shown in Fig. 2.

The locking frame 68 is provided with an extension 187 which co-operates with an extension 188 of the bell crank 61 which operates the locking frame latch operating member 65 to release the perforator cam detent 78. When the operation of any key of the keyboard (except the "run-out" key 60) moves the universal bar 59 to the left this, as has been explained above, releases the locking frame 68 which then rotates clockwise under the influence of spring 72 and presses down the perforator cam detent 78 and sets the perforator cam sleeve 24 into rotation. Once the locking frame 68 has been released to rotate clockwise it will, by acting through its extension 187, press down extension 188 of bell crank 61 and this will draw the universal bar 59 to the left to its fullest extent and ensure that the universal bar also acts to release the transmitter cam sleeve through the movement of three-armed member 177, as previously explained.

From the above it can be seen that if either the perforator cam sleeve or the transmitter cam sleeve is released for rotation by the operation of any key of the keyboard (except the run-out key 60, which does not engage the universal bar 59), both the perforator and the transmitter will be rendered simultaneously operative if either cam sleeve is released.

It has been stated previously in the description that the perforator driving spindle is geared to run at a higher speed than that of the transmitter driving spindle. This is because the possible speed of perforation is only limited by the operator's skill while that of the transmitter must be limited by the speed at which it is possible to operate a printing receiver. In a perforator the signal combination is set up and then all the corresponding holes are perforated in the paper tape in one operation. In the case of a transmitter however, the combination is set up and then the code elements are transmitted seriatim so that, apart from the limitations imposed by the transmission line and the printing receiver, a transmitter cannot be worked at so high a speed as a perforator.

When the keyboard is being used to control the perforator and the transmitter simultaneously (switch position 3), it would therefore be possible to arrange that the perforator cam sleeve 24 was only set into operation when the transmitter locking frame was actuated to release the transmitter cam sleeve. It is however preferable to adopt the arrangement described above and to ensure that when either the perforator cam sleeve or the transmitter cam sleeve is released the other cam sleeve will also be released.

It will be remembered that when the four-position switch shown in Fig. 5 is actuated to position 3 in which both perforator and transmitter are being controlled by the keyboard cam 104 is in a position preventing the "run-out" key 60 from releasing the latch operating member 65 so that continuous rotation of the perforator cam sleeve 24 will not be obtained by the action of the "run-out" key on the "run-out" bar 97 (Fig. 2).

If, when the run-out key 60 is operated, both the perforator cam sleeve and the transmitter cam sleeve were set into rotation by the action of the respective trips, the perforator cam sleeve 24 would make more revolutions while the key was held depressed than would the transmitter cam sleeve. This would result in a discrepancy between the perforated record and the transmitted messages so that when the perforated tape was used for later transmission the printed record would differ in spacing line feed, tabulation and so on, from the originally transmitted message.

It is in order to avoid this difficulty that the "run-out" trip mechanism is rendered inoperative when the four-position switch is set in position (3) so that the perforator trip is placed under the control of the transmitter and must operate step-by-step in synchronism therewith.

When the "run-out" key is operated the transmitter cam sleeve will continue to rotate as explained in said last-named copending application and once in each revolution of the sleeve the frame 170 (Fig. 5) will be actuated and this will, as explained above, result in the perforator cam sleeve 24 being released for one revolution for each revolution of the transmitter cam sleeve.

While the principles of the invention have been described above in connection with a specific example and particular modification thereto, it is to be clearly understood that this description is made only by way of example and not as a limitation on the scope of the invention.

What is claimed is:

1. Printing telegraph apparatus comprising a keyboard, a telegraph transmitter, a telegraph receiver, means for recording printing telegraph code signal combinations on a tape in form for control of a printing telegraph transmitter, means coupled between said receiver and said recording means for controlling operation of said recording means in response to signals received over said receiver, additional means coupled among said keyboard, said recording means and said transmitter for selectively controlling operation of said recording means and said transmitter by said keyboard, and further means under control of said additional means coupled among said keyboard, said recording means and said transmitter for selectively rendering said first-named coupling means inoperative when said recording means is under control of said keyboard, whereby the received signals received over said receiver are ineffective to actuate said recording means.

2. Printing telegraph apparatus as claimed in claim 1, wherein said recording means comprises a plurality of recording members, one for each code element, an interponent member corresponding to each of said members, a hammer, means for selectively positioning said interponent members between said hammer and said first-named members, said last-named means under joint control of said coupling means and said selectively controlling means.

3. Printing telegraph apparatus as claimed in claim 1 wherein said further means coupled among said keyboard, said recording means and said transmitter comprise manually operable means for placing said recording mechanism under alterative control or for altering the operative association of said keyboard.

4. Printing telegraph apparatus as claimed in claim 3 in which said manually operable means comprises a manually rotatable shaft having cams thereon operating with cam follows for mechanically effecting the required changes.

5. Printing telegraph apparatus as claimed in claim 4 wherein the cams on said shaft are so shaped and positioned as to afford four positions in which the mechanism for recording signals on a tape can bep lacer respectively, (1) under the control of said receiver; (2) not under control of either said receiver or said keyboard; (3) under the control of said keyboard whilst said keyboard is controlling a telegraph transmitter; (4) under the control of said keyboard whilst said telegraph transmitter is rendered inoperative.

6. Printing telegraph apparatus as claimed in claim 1, wherein said recording means comprises a cam sleeve, said transmitter comprises a cam sleeve, a universal bar operable by a key of said keyboard and means for enabling the movement of said universal bar to selectively release either said recording means cam sleeve said transmitter cam sleeve or both said cam sleeves.

7. Printing telegraph apparatus as claimed in claim 6, wherein said means for enabling the movement of said universal bar to selectively release either or both of said cam sleeves further comprises separate means coupled between said universal bar and said cam sleeves, respectively, eavch of said separate means adapted to move said universal bar to its fully operated position thereby to insure release of both of said cam sleeves.

REGINALD DENNIS SALMON.
ALAN ARTHUR KIRCHEL.

REFERENCES CITED

The following references are of record in the file of this patent:

UNITED STATES PATENTS

| Number | Name | Date |
|---|---|---|
| 1,804,496 | Creed et al. | May 12, 1931 |
| 1,941,916 | Rothermel | Jan. 2, 1934 |
| 2,144,758 | Gundlfinger | Jan. 24, 1939 |
| 2,348,214 | Gubish | Jan. 8, 1946 |
| 2,392,484 | Lake | Jan. 8, 1946 |